(12) United States Patent
Ziegenbein et al.

(10) Patent No.: US 8,402,984 B1
(45) Date of Patent: Mar. 26, 2013

(54) FLOOD PREVENTING SYSTEM, AND METHOD OF USE

(76) Inventors: Keith J. Ziegenbein, Ashland, NE (US); Zachary J. Ziegenbein, Gretna, NE (US); Zebadiah W. Ziegenbein, Ashland, NE (US)

( * ) Notice: Subject to any disclaimer, the term of this patent is extended or adjusted under 35 U.S.C. 154(b) by 452 days.

(21) Appl. No.: 12/799,837

(22) Filed: May 4, 2010

Related U.S. Application Data

(63) Continuation-in-part of application No. 12/660,512, filed on Mar. 1, 2010.

(60) Provisional application No. 61/274,664, filed on Aug. 20, 2009, provisional application No. 61/277,357, filed on Sep. 24, 2009.

(51) Int. Cl.
*F16K 31/04* (2006.01)
*F16K 51/00* (2006.01)
(52) U.S. Cl. ... 137/15.11; 137/59; 137/312; 251/129.04
(58) Field of Classification Search .............. 251/129.04; 137/59, 312, 15.11
See application file for complete search history.

(56) References Cited

U.S. PATENT DOCUMENTS

| | | | | |
|---|---|---|---|---|
| 5,113,892 | A * | 5/1992 | Hull et al. ...................... | 137/62 |
| 5,377,529 | A * | 1/1995 | Boyd ................................ | 73/40 |
| 6,025,788 | A * | 2/2000 | Diduck ................... | 340/870.16 |
| 6,186,162 | B1 * | 2/2001 | Purvis et al. .................. | 137/312 |
| 6,812,848 | B2 * | 11/2004 | Candela ....................... | 340/605 |
| 7,403,839 | B1 * | 7/2008 | Kaplan ........................ | 700/282 |
| 7,549,435 | B2 * | 6/2009 | Walter ...................... | 700/15.11 |
| 8,201,572 | B2 * | 6/2012 | Segal ........................ | 251/129.04 |
| 2002/0033759 | A1 * | 3/2002 | Morello ....................... | 340/605 |
| 2003/0066340 | A1 * | 4/2003 | Hassenflug ...................... | 73/46 |
| 2006/0191323 | A1 * | 8/2006 | Garabedian et al. ............. | 73/40 |
| 2009/0207031 | A1 * | 8/2009 | Barth et al. .................... | 340/605 |

* cited by examiner

*Primary Examiner* — Kevin Lee
(74) *Attorney, Agent, or Firm* — James D. Welch

(57) ABSTRACT

The present invention is a system and method for detecting water in locations in homes and buildings etc. where it should not be present, and responding by terminating water inlet access to plumbing in the home or building etc., and by opening a pressure dump valve to relieve leak promoting pressure remaining in the plumbing.

20 Claims, 6 Drawing Sheets

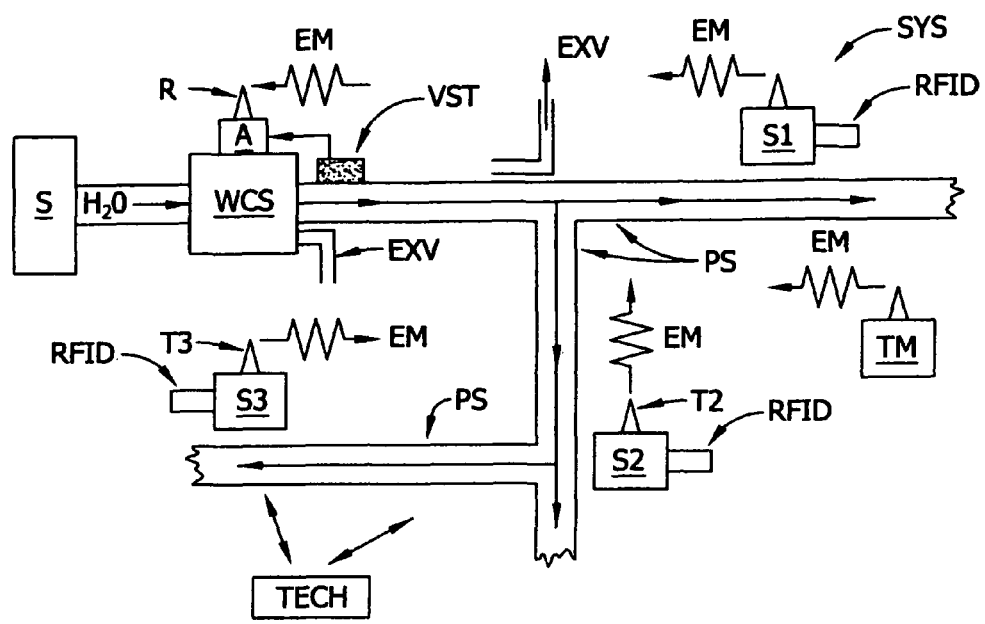
FIG. 1b
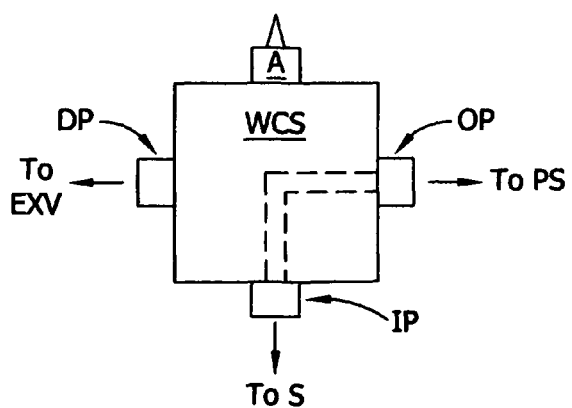
FIG. 1c₁

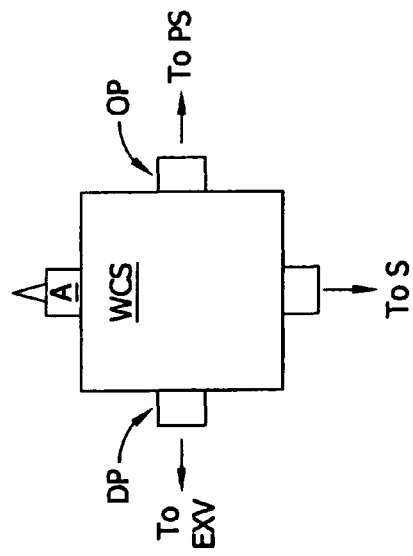
FIG. 1c₂
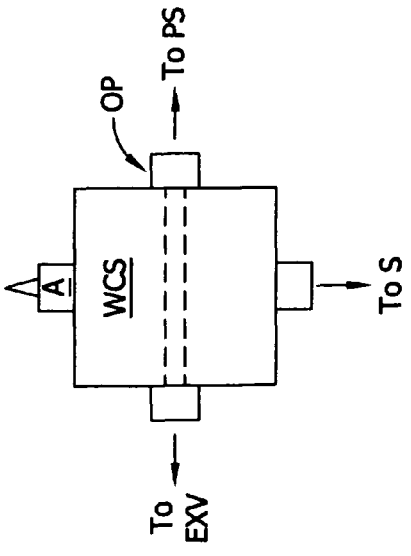
FIG. 1c₃
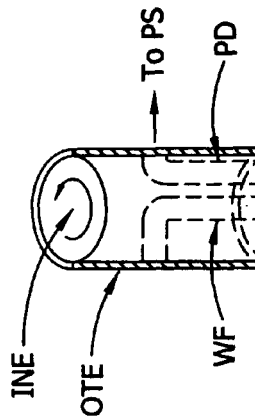
FIG. 1c₄
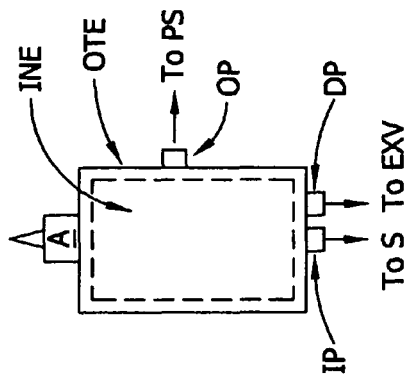
FIG. 1c₅

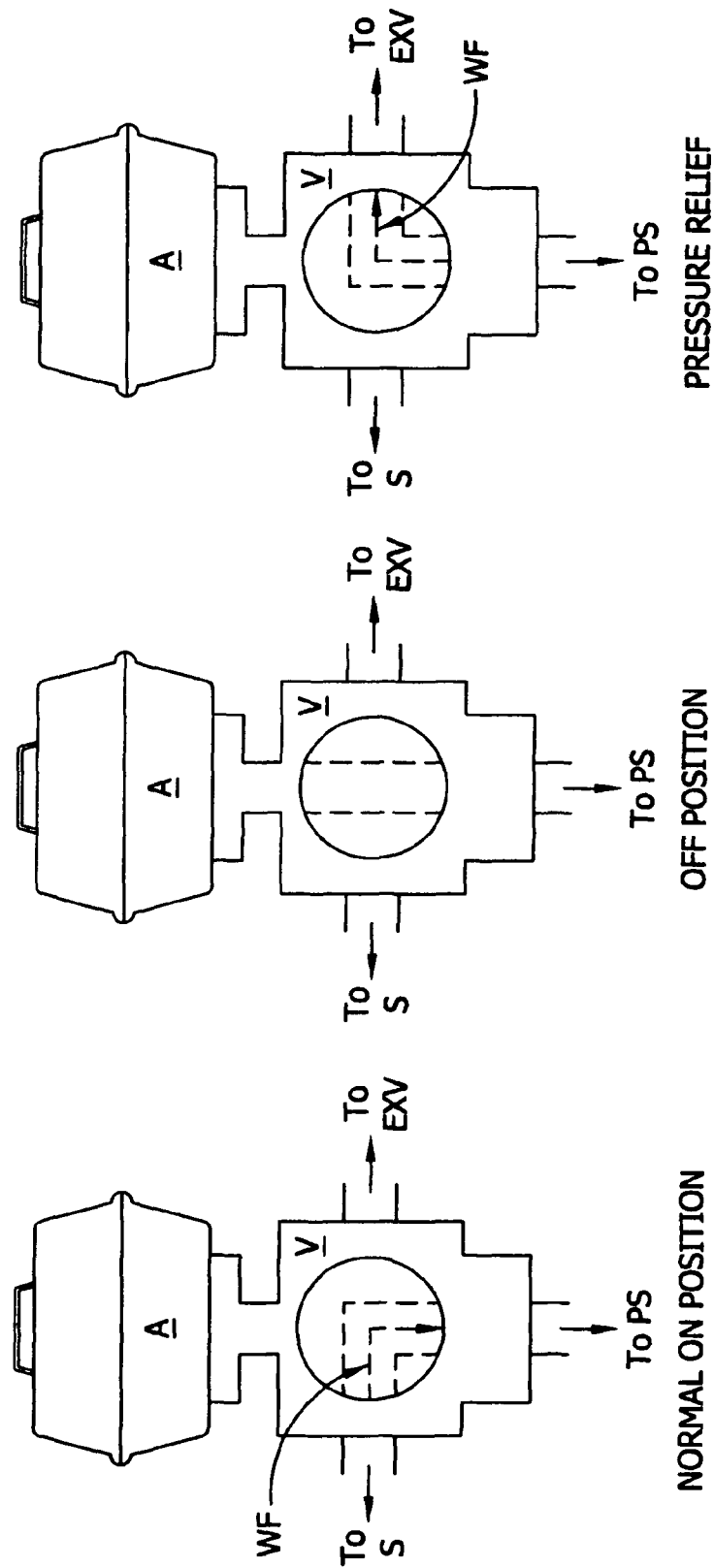
FIG. 1c₆ NORMAL ON POSITION
FIG. 1c₇ OFF POSITION
FIG. 1c₈ PRESSURE RELIEF

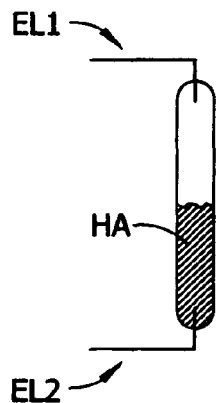
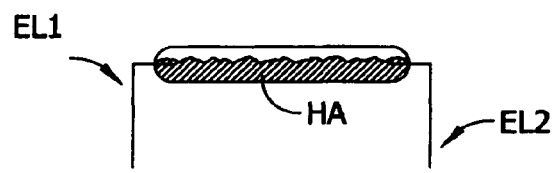
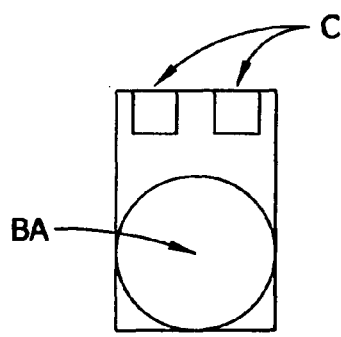
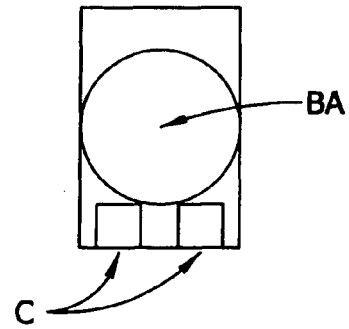
FIG. 7a   FIG. 7b   FIG. 7c   FIG. 7d
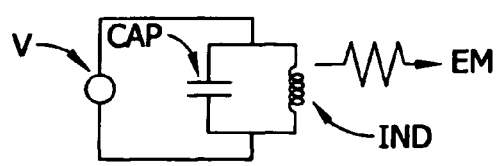
FIG. 8

FLOOD PREVENTING SYSTEM, AND METHOD OF USE

CROSS-REFERENCE TO OTHER APPLICATIONS

This Application is a CIP of 12/660,512 Filed Mar. 1, 2010, and Claims Benefit of Provisional Applications 61/274,664 Filed Aug. 20, 2009, and 61/277,357 Filed Sep. 24, 2009.

TECHNICAL FIELD

The present invention relates to prevention of water damage in homes and building or the like resulting from leaks in, or bursts in plumbing and appliances or the like. More particularly the present invention is a system and method for detecting water in locations in homes and buildings where it should not be present, and responding by terminating water inlet access to plumbing in said home or building or the like, including pressure dump valve capability.

BACKGROUND

It is known that water can cause extensive damage in homes or buildings or the like when the integrity of a water system therein is compromised. Anyone who has ever experienced loss resulting from leaks or burst pipes or malfunctioning appliances etc. is acutely aware of the problem.

It is also known to provide valves and/or actuators for use in controlling fluid flow at local and remote locations.

A Patent to Purvis et al., U.S. Pat. No. 6,186,162 discusses the problem and provides one approach to protecting against water damage by applying a water shut off ball valve adapted to a 90 degree open to shut rotation, and which is caused to operate by receipt of electrical pulses received thereby from a transmitter when a pair of adjacently located electrodes detect the presence of water therebetween.

Additional known Patents are:
U.S. Pat. No. 7,549,435 to Walter which describes systems and methods for correcting a leak;
U.S. Pat. No. 7,403,839 to Kaplan which describes a water shut-off system;
U.S. Pat. No. 6,812,848 to Candele describes a water leak mitigation system;
U.S. Pat. No. 6,025,788 to Diduck describes a liquid and/or gas leak detection and automatic shut-off system;
U.S. Pat. No. 5,377,529 to Boyd describes a leak detection device and methods of constructing and utilizing same.

An application, US2009/0207031 published Aug. 20, 2009 by Barth et al., describes a water leak detection and surveillance system and method.

Another application, US 2006/0191323 published Aug. 31, 2006 by Garabedian et al., describes an automated system for detection of gas an water leaks etc.

Yet another application, US 2003/0066340 published Apr. 10, 2003 by Hassenflug describes a fluid detection and automatic shut off valve.

And another application, US 2002/0033759 by Morello describes a system and method for water leak detection and suppression.

Even in view of the prior art, need remains for improved systems and method of their application which are directed to prevention of water damage in homes and buildings or the like, and for valves and actuators with the capability of providing notice to those in charge of maintaining the valves and actuators when maintenance or replacement should be accomplished.

DISCLOSURE OF THE INVENTION

The preferred embodiment of the present invention is a system for controlling access of water to a plumbing system comprising:
a water control system comprising an actuator, water flow valve and pressure dump valve in functional combination.

Operation of the water flow valve controls water flow therethrough from a source of water into said plumbing system, and said pressure dump valve controls release of pressure in the plumbing system. The actuator controls operation of said water control system, and has functionally associated therewith apparatus for receiving electromagnetic signals.

The water control system further comprises at least one water sensing means locally or distally located from said water control system, comprising a communication apparatus for transmitting an electromagnetic signal to the apparatus for receiving electromagnetic signals associated with the actuator when said at least one locally or distally located water sensing means senses the presence of water at its location.

In use the water control system is located between the source of water and the plumbing system, and the at least one locally or distally located water sensing means is positioned at a location at which it is desired to prevent the presence of unintended and undesired water. If water is sensed by said at least one locally or distally located water sensing means, an electromagnetic signal is caused to be sent to the apparatus for receiving an electromagnetic signal functionally associated with said actuator. The water flow valve is caused to operate thereby to prevent the flow of water therethrough, and thereafter said pressure dump valve is caused to open and release pressure in said plumbing system.

It is noted that in this embodiment the water control system is a single integrated unit comprises three ports, said three ports being:
an input port for receiving water from said source thereof;
an output port for entering water received by the input port to said plumbing system; and
a pressure dump port.

Said water control system can be operated to any of at least three positions, said three positions functionally providing that:
water flows from said input port to said output port and said pressure dump port is closed;
water does not flow from said input port to said output port and said pressure dump port is closed; and
water does not flow from said input port to said output port and said pressure dump port is open thereby releasing pressure in said plumbing system.

The system can comprise a locally positioned water sensing means near or integrated into said water control system, such that the presence of water thereat causes a signal to be provided to said apparatus for receiving an electromagnetic signal functionally associated with said actuator, which in turn causes said water flow valve operation to stop water flow into said plumbing system and said pressure dump valve to release pressure in said plumbing system.

A signal can be provided to said apparatus for receiving an electromagnetic signal functionally associated with said actuator by said at least one distal or locally positioned water sensing means.

The system can comprise a plurality of distally located water sensing means placed in a plurality of locations distal from said water control system, each of which comprises a communication apparatus for transmitting an electromagnetic signal to said actuator.

The system can further comprise a temperature sensor and an associated communication apparatus for transmitting an electromagnetic signal to the apparatus for receiving an electromagnetic signal functionally associated with said actuator when temperature approaches or dips below freezing, such that the water flow valve is caused to stop water flow into said plumbing, and said pressure dump valve is caused to operate and release pressure in said plumbing system. Thus, the water control system can function as a freeze-dump valve.

The electromagnetic signal can be transmitted from said at least one locally or distally located water sensing means through wiring or wirelessly etc.

A method of controlling access of water to a plumbing system, comprises:
  a) providing a system for controlling access of water to a plumbing system as described just above; and
  b) upon the sensing of water by said at least one locally or distally located water sensing means, causing an electromagnetic signal to be transmitted to the apparatus for receiving electromagnetic signals functionally associated with said actuator, to the end that operation of said actuator causes the water flow valve to stop water flow therethrough, and said pressure dump valve is then caused to operate and release pressure in said plumbing system.

Said method can involve electromagnetic signal being transmitted from said at least one locally or distally located water sensing means via a selection from the group consisting of:
  a) through wiring; and
  b) wirelessly.

Said method can involve further providing temperature sensor and an associated communication apparatus for transmitting an electromagnetic signal to the apparatus for receiving electromagnetic signals associated with said actuator when temperature approaches or dips below freezing, such that the water control system is caused to stop water flow into said plumbing system and said pressure dump valve is thereafter caused to operate and release pressure in said plumbing system.

In another embodiment the present invention is a system for controlling access of water to a plumbing system in a house, building, boat or the like comprising:
  an actuator and valve combination characterized in that operation of the valve controls water flow therethrough from a source of water into said plumbing system, and the actuator controls operation of said valve, said actuator having functionally associated therewith means for receiving electromagnetic signals;
  at least one water sensing means locally or distally located from said actuator and valve combination, comprising a communication apparatus for transmitting an electromagnetic signal to the actuator of the actuator and valve combination when said at least one locally or distally located water sensing means senses the presence of water at its location; and
  a pressure dump valve for releasing pressure in the plumbing system.

(It is noted that in this embodiment the actuator and valve combination is physically separate from the pressure dump valve).

In use, the actuator and valve is located between the source of water and the plumbing system, and the at least one locally or distally located water sensing means is positioned at a location in said house, building, boat or the like at which it is desired to prevent subjection to the presence of unintended and undesired water. If water is sensed by said at least one locally or distally located water sensing means, an electromagnetic signal is caused to be sent by the at least one water sensing means and is received by the apparatus for receiving an electromagnetic signal functionally associated with said actuator, to the end that the valve operates and prevents the flow of water therethrough. And, in the preferred embodiment, said pressure dump valve is caused to open and release pressure therein, after the actuator and valve combination is caused to stop water flow into said plumbing.

Said system can comprise a locally positioned water sensing means near or integrated into said actuator and valve combination, such that the presence of water thereat causes a signal to be provided to said actuator which causes valve operation to stop water flow into said plumbing system.

Said system can comprise a plurality of distally located water sensing means placed in a plurality of locations distal from said actuator and valve combination, each of which comprises a communication apparatus for transmitting an electromagnetic signal to the actuator of the actuator and valve combination.

A signal can be provided to said pressure dump valve by said actuator and valve combination when it has operated to stop water flow into said plumbing system, or a signal can be provided to said pressure dump valve by said at least one distal or locally positioned water sensing means.

Said system can further comprise a temperature sensor and an associated communication apparatus for transmitting an electromagnetic signal to the actuator of the actuator and valve combination when temperature in the house, building, boat or the like approaches or dips below freezing, such that the actuator and valve combination is caused to stop water flow into said plumbing and said pressure dump valve is caused to operate and release pressure in said plumbing system. That is, the pressure dump valve can operate as a freeze-dump valve.

Said system can provide that the electromagnetic signal is transmitted from said at least one locally or distally located water sensing means via wiring in the house, building, boat or the like, or wirelessly etc.

A method of controlling access of water to a plumbing system in a house, building, boat or the like, comprises:
  a) providing a system for controlling access of water to a plumbing system in a house, building, boat or the like as described just above; and
  b) upon the sensing of water by said at least one locally or distally located water sensing means, causing an electromagnetic signal to be transmitted to the apparatus for receiving electromagnetic signals functionally associated with said actuator of the actuator and valve combination, to the end that operation of said valve occurs to stop water flow therethrough, and said pressure dump valve is caused to operate and release pressure in said plumbing system.

Again, the method can involve the electromagnetic signal being transmitted from said at least one locally or distally located water sensing means via wiring in the house, building, boat or the like, or wirelessly etc.

Said method can further comprise providing temperature sensor and an associated communication apparatus for transmitting an electromagnetic signal to the actuator of the actuator and valve combination when temperature in the house, building, boat or the like approaches or dips below freezing, such that the actuator and valve combination is caused to stop water flow into said plumbing, and said pressure dump valve is also caused to operate and release pressure in said plumbing system.

Additional disclosure provides that the present invention is a flood abating system for application in an designated space comprising:

apparatus for receiving water from an external source;

a water flow control valve comprising apparatus for automatically operating said water flow control valve and apparatus for receiving electromagnetic signals for actuating said automatic operation;

a pressure dump valve comprising apparatus for automatically operating said pressure dump valve and apparatus for receiving electromagnetic signals for actuating said automatic operation; and plumbing in said area into which water flowing through said water flow control and pressure dump valves flows into.

In use, if water presence at an unintended location in the enclosed area is detected, the water flow control valve is caused to operate to stop water flow into the plumbing system, and the pressure dump valve operates to relieve pressure therein.

Said system can further comprise, in said space:

sensor apparatus for monitoring temperature in said space and providing signals to the water flow control and pressure dump valves, both directly or one via the other, when ambient temperature in the space decreases below a selected temperature;

such that in use during normal operation water is caused to flow from said external source, through said water flow control and pressure dump valves into said plumbing in said space. When the ambient temperature in said enclosed space decreases below said selected temperature, said apparatus for monitoring temperature provides signals to the water flow control and pressure dump valves, when ambient temperature inside the space decreases below a selected temperature, causes an electromagnetic signal to be transmitted. Upon receipt of which transmitted signal said water flow control valve operates to prevent water flow and said pressure dump valve opens to release pressure in said plumbing in said area, preferably vented outside thereof, where the area is enclosed.

Said system can further comprise a plurality of water sensors located at a plurality of locations in said space, each thereof having associated therewith apparatus for transmitting electromagnetic signals, each said water sensor being of a substantially two sided two dimensional area having a much smaller third depth dimension, there being at least two electrical contacts on each two dimensional area side thereof, each said water sensor further comprising tilt detection alarm means which sound when its two dimensional area is not oriented substantially horizontally.

In use, if at least one water sensor detects the presence of water leaking from said plumbing system it transmits an electromagnetic signal which is received by said water flow control valve apparatus for receiving electromagnetic signals and said apparatus for automatically operating said water flow control valve is in turn caused to operate, such that water flow into the plumbing in said area is prevented. The present invention also provides that the pressure dump valve then operate to relieve pressure in the plumbing system and thereby prevent additional leakage.

Said system can further comprise battery backup for powering at least one selection from the group of:

operation of said water flow control valve;
operation of said pressure dump valve;
operation of said temperature and water sensors; and
electromagnetic signal transmitting and receiving means associated with said temperature and water sensors and said water flow control and pressure dump valves respectively;

said battery backup for said at least one selection having associated therewith apparatus for detecting low battery voltage which is less than a selected value, and producing an alarm when said battery voltage reaches said low battery voltage.

A method of assuring operability of a flood abating system for application in a space comprises:

a) providing a flood abating system as described above, but in addition further comprises:

means, (eg. ultrasonic), for detecting water flow status into said plumbing in said area; and/or apparatus for keeping count of operation and resetting cycles of said water flow control and/or pressure dump valves and apparatus for transmitting an alarm signal when the number of cycles of at least one of the water flow control and pressure dump valves reaches a selected number.

Where apparatus for keeping count is implemented, the method can provide that a counter be incorporated into valves and actuators such that when the counter reaches a specified count a warning can be sent over wire or by a wireless technique and a light can be caused to light indicating that a valve and/or actuator that has reached the number of predetermined operations. In some cases the valve and actuator can even be, at least on a temporary basis, disabled. This operation will serve to reduce the problem of unexpected valve failure in the field.

Said method can further comprise the steps of:

b) at predetermined times applying said apparatus for detecting water flow status into said plumbing in said area, and if said flow is below some selected rate, causing said water control and/or pressure dump valves to cycle through operation and resetting; and c) applying said apparatus for keeping count of operation and resetting cycles of said water flow control and/or pressure dump valves to count the number of operations thereof which have occurred, and upon reaching a selected number causing an alarm signal to be transmitted.

Said method can further comprise servicing of the water flow control and pressure dump valve upon one thereof reaching a selected number of operations.

Said method can involve said system further comprising apparatus for controlling the water flow control valve operation closing and opening times, and in which the time of closing is set to be faster than the time of opening to diminish water hammer.

Continuing, the present invention can be a system for controlling access of water to a plumbing system in a house, building, boat or the like comprising:

an actuator and valve combination characterized in that operation of the valve controls water flow therethrough from a source of water into said plumbing system, and the actuator controls operation of said valve, said actuator having functionally associated therewith means for receiving electromagnetic signals, (eg. RF, signal over power system, via LAN or Internet etc.);

at least one water sensing means distally located from said actuator and valve combination, comprising a communication apparatus for transmitting an electromagnetic signal to the actuator of the actuator and valve combination when said at least one distally located water sensing means sense the presence of water at its location.

Preferably, the system comprises a plurality of distally located water sensing means placed in a plurality of locations distal from said actuator and valve combination. Each thereof comprises a communication apparatus for transmitting an electromagnetic signal to the actuator of the actuator and valve combination when it senses the presence of water at its location to the end that the sensing of water by a distally located water sensing means can cause valve operation.

In use the actuator and valve is located between the source of water and the plumbing system, and the at least one distally located water sensing means is positioned at a location in said house, building, boat or the like at which it is desired to prevent being subjected to the presence of unintended and undesired water. If water is sensed by said at least one distally located water sensing means, an electromagnetic signal is caused to be sent by the at least one water sensing means distally located from said actuator and valve combination means, and received by the apparatus for receiving an electromagnetic signal functionally associated with said actuator to the end that the valve operates and prevents the flow of water therethrough.

The system can also preferably comprises a local water sensing means near or integrated into said actuator and valve combination, such that the presence of water thereat can cause valve operation.

Typically, each present water sensing means further comprises at least one selection for the group consisting of:
  an indicator light system; and
  an audio signal producing system;
said at least one selection serving to identify the operational status of thereof, such as valve open/closed position.

All electrical power requiring elements of the system are typically powered by grid system provided A/C mains during normal operation, and preferably are powered by battery produced voltage as a back-up. In this light, a system can include providing a relay to disconnect the A/C grid power form the house, building or the like if any water sensor senses the presence of water where it is not wanted. Water sensors and the valve actuator are preferably provided low battery indication.

As mentioned, the system water sensing means preferably comprises at least two contacts situated in proximity to one another and have an electric potential applied therebetween such that the presence of water therebetween can cause current to flow from one contact to another. Preferred, but not necessarily, contacts are gold plated to increase sensitivity to water presence. Each present water sensing means comprising at least two contacts situated in proximity to one another which can be mounted in, for instance, a silver dollar sized container which maintains said contacts substantially parallel to an underlying floor and electrical wiring connection means comprises a "lay-flat" mechanism such that in use the contacts have substantially no influence thereupon to become oriented other than substantially parallel to an underlying floor. It is also noted that water sensing contacts in the silver dollar sized container can be double sided such that if it becomes oriented "up-side-down" it will still operate. Typically water sensing contacts said silver dollar sized container will be accessed using a plug. However, it is to be understood that water sensors can be provided in any specific configuration. For instance, it might be more convenient to not use a plug access approach in difficult to access areas, (eg. behind a toilet), as if the plug comes loose it is inconvenient for a user to reconnect it, and worse, it might go undetected.

The system further comprises a control panel that allows a user to manually assume control of the valve, such that said user can conveniently close said valve when desired, such as during a planned period of absence. Said control panel optionally includes apparatus for periodically overriding a user's manual closing of said valve, such that at desired times water is allowed to flow therethrough, such as for the purpose of enabling watering of yards.

It is noted that it is possible that a system can simply provide a manually operated control panel, and that water sensors not used. For, instance, at a remote cabin it might be desired to simply have a control panel at a convenient location therein which a user can easily access and operate when planning a prolonged absence.

It is also noted that the valve can be of a three piece body construction and comprise an actuator with a clear dome through which visual indicators can be viewed. Said valve construction can allow easy removal for repairs without the need to disconnect pipe union connections. This can be useful where, for instance, seals are to be replaced.

The present invention system preferably includes a "pressure dump" system, optionally comprising a temperature sensor that monitors temperature inside a house, building, boat or the like. Associated therewith is apparatus for communicating with the actuator and valve combination. If temperatures approach freezing therein the temperature sensor causes the apparatus for communicating with the actuator and valve combination to send a signal to the actuator and valve combination which causes the valve to shut water flow from the source into the plumbing, off. In addition, when this feature is included, the system also will comprise a second valve which then is caused to open and dump at least some water already in the plumbing therefrom, typically into a drain or into a designated area or to an outside vent. Eliminating the pressure in the plumbing serves to insure against pipes bursting if remaining water therein freezes, as room for its expansion is then present. The temperature sensor can send signals to both said valves, or only one thereof. In the later case the other valve will receive a signal to operate from the valve that did receive a signal. Typically the a signal will be sent to the actuator and valve combination which causes the valve to shut water flow from the source into the plumbing off and it can send the signal to the pressure dump valve.

A method of the present invention comprises controlling access of water to a plumbing system in a house, building, boat or the like, comprises:
  a) providing a system as described above;
  b) upon the sensing of water by said local or at least one distally located water sensing means causing an electromagnetic signal to be transmitted to the apparatus for receiving electromagnetic signals functionally associated with said actuator of the actuator and valve combination, to the end that operation of said valve occurs to stop water flow therethrough.

The electromagnetic signal can be transmitted from said at least one distally located water sensing means via a selection from the group consisting of:
  a) through wiring in the house, building, boat or the like; and
  b) wirelessly.

The method can involve providing an alarm, (eg. audio or visual), when a local or distal water sensor senses the presence of water operation thereof occurs, to the end that a user of said system can determine the location of sensed undesired presence of water. The method can also involve providing low battery indication wherein the alarm means which indicates operation of said local or at least one distally located water sensing means, and the indication of a low battery, are perceivably different.

The method can further comprise monitoring and recording a history of valve operation, and if during a predetermined time period it is determined that said valve has not operated to cycle through a closing and opening procedure, then testing said valve by causing it to cycle through a function status determining closing and opening.

The method can involve performing periodic, (eg. monthly), valve testing cycle be carried out. Preferred practice is that said testing cycle is effected only when at least one selection from the group applies:
- significant water is not flowing through said valve; and
- a real time clock indicates it is between about 12 AM and 6 AM.

Said testing preferably includes providing an alarm to be sounded if the testing of said valve by causing it to cycle through a function status determining closing and opening, shows the valve is not acceptably functional. In addition, a sensor of water flow through the valve can be present and serve to prevent valve testing unless water flow rate is less than some predetermined value. A possible approach is enabling this feature is to apply an ultrasonic sensor which senses Doppler effects of water flow.

During testing or normal operation the method can involve times of closing and opening of said valve are related to one another by a selection from the group:
- they are equal in time;
- the time of opening is longer that the time of closing; and
- the time of opening is shorter that the time of closing.

For instance, to prevent "water hammer" valve opening can be caused to be slower than is closing. This can be accomplished by, for example, applying a micro processor/controller to apply voltage in a programmed manner. For instance, power might be applied to the actuator in a sequence of:
- apply power for 100 ms;
- wait for 500 ms;
- apply power for 150 ms;
- wait for 1000 ms;
- apply power for 200 ms;

etc. until the valve is open to the extent desired, (typically fully open). As a non-limiting example, the total open time can be 3 seconds, with closing time being less than 3 seconds. When valve closing is desired, full power can simply be applied to the actuator to effect fast operation. It is noted that where a micro processor/controller is applied, it can be programmed to provide any desired opening/closing voltage application sequence. However, this does not prohibit the cycle times being set to be equal. It is also noted that the preferred approach is that signals which control the actuator are based on time of application and voltage, rather than on a pulsed signal basis.

The method can involve a user assuming override control at a control panel that allows a user to manually assume control of the valve, such that said user can conveniently close said valve when desired, such as during a planned absence, and said user operates said control panel to cause said valve to close. The control panel will typically comprise a programmable timer which enables periodically over-riding a user's manual closing of said valve, such that at desired times water is allowed to flow therethrough, such as for the purpose of enabling watering of a yard. Further, there can be a sensor which detects water flow through the valve, and delays effecting a user's manual override to close the valve until said flow is below a selected value, and possibly after a delay period. This can be valuable where, for instance, a user attempts to manually close a valve when a dishwasher is operating. The described feature will allow the dishwasher cycle to finish its cycle before the user's command is effective. However, even during a manual override, upon the sensing of water by the local or a distally located water sensing means will still cause the apparatus for receiving electromagnetic signals functionally associated with the actuator of said actuator and valve combination to receive an electromagnetic signal and in turn causes operation of said valve to stop water flow therethrough. The described application of a user override control panel is useful when, for instance, a user is away from the home, building, boat or the like for an extended period.

A supplemental method of testing a system for controlling access of water to a plumbing system in a house, building, boat or the like, comprises:

a) providing a system for controlling access of water to a plumbing system in a house, building, boat or the like comprising:
- an actuator and valve combination characterized in that operation of the valve controls water flow therethrough from a source of water into said plumbing system, and the actuator controls operation of said valve, said actuator having functionally associated therewith means for receiving electromagnetic signals;
- a plurality of water sensing means distally located from said actuator and valve combination, comprising a communication apparatus for transmitting an electromagnetic signal to the actuator of the actuator and valve combination when said at least one distally located water sensing means senses the presence of water at its location, said plurality of one water sensing means each further comprising apparatus for individually detecting the distal location thereof.

In use, the actuator and valve is located between the source of water and the plumbing system, and the plurality of distally located water sensing means are positioned at locations in said house, building, boat or the like at which it is desired to prevent being subjected to the presence of unintended and undesired water. If water is sensed by a distally located water sensing means, an electromagnetic signal is caused to be sent thereby to said apparatus for receiving electromagnetic signals functionally associated with said actuator of the actuator and valve combination means, to the end that the valve operates and prevents the flow of water therethrough.

Said method continues with:

b) periodically causing operation of at least one of said means for individually detecting the location thereof to operate, and, using it as a guide to enable identifying the location thereof, physically approaching, accessing and physically and concretely testing the operability of the associated water sensing means, by a process that simulates the unwanted presence of water at its location and noting the response of said system for controlling access of water to a plumbing system in a house, building, boat or the like; and c) using the results of said testing to direct the repairing or replacing any of said at least one water sensing means which does not pass said testing, said repairing or replacing constituting a concrete and tangible physical change.

Said method can comprise sequentially causing operation of a selection from the group consisting of:
- at least two of said apparatus for individually detecting the location thereof to operate; and
- all of said plurality of apparatus for individually detecting the location thereof to operate; and using the results of said testing to direct physical concrete repairing or replacing each of said tested plurality of water sensing means which do not pass said testing, said repairing or replacing constituting a concrete and tangible physical change.

Said method can further comprise entering the results of said testing of the operability of said at least one of said plurality of water sensing means into machine readable storage and accessing said machine readable storage for the purpose of analyzing the contents thereof and presenting at least some results thereof in a concrete and tangible media.

Said method can involve machine readable storage being located distally from said system for controlling access of water to a plumbing system in said house, building, boat or the like, and the results of testing of the operability of each of said at least one water sensing means are sent to said machine readable means by an electromagnetic signal, (eg. via Internet or the like, over wire or wirelessly etc.).

The method of use can involve the valve manufacturer providing maintenance of and/or replacement of valves, and could involve the manufacturer providing a monitoring service. The end result will be to provide users uninterrupted device service and peace of mind as regards unexpected valve failures.

The invention will be better understood by reference to the Detailed Description Section of this Specification, in combination with the Drawings.

BRIEF DESCRIPTION OF THE DRAWINGS

FIG. 1b shows an alternative present invention system (SYS).

FIGS. 1c1-1c2 show a demonstrative present invention water control system (WCS) system with different operational porting configurations.

FIGS. 1c4-1c8 demonstrative possible present invention water control system (WCS) practical embodiments.

FIG. 4 generally shows an actuator (A) Valve (V) combination, a fluid flow control means (FCM) modified to include a Counter (CNT), a Light Indicator (I), and a Signal Transmission Means (STM).

FIGS. 7a and 7b demonstrate an orientation detection means in the form of a mercury (Hg) switch, which when in the FIG. 7a orientation does not conduct electricity between electrodes (EL1) and (EL2), but in FIG. 7b does conduct between said electrodes (EL1) and (EL2).

FIGS. 7c and 7d show an alternative orientation detection means in the form of a dual contact (C) system in functional combination with a ball in a tube.

FIG. 8 is included to show a source of electromagnetic radiation (EM) can be a circuit comprising a capacitor (CAP) and inductor (IND) supplied by a variable voltage (V).

DETAILED DESCRIPTION

Figure 1A:
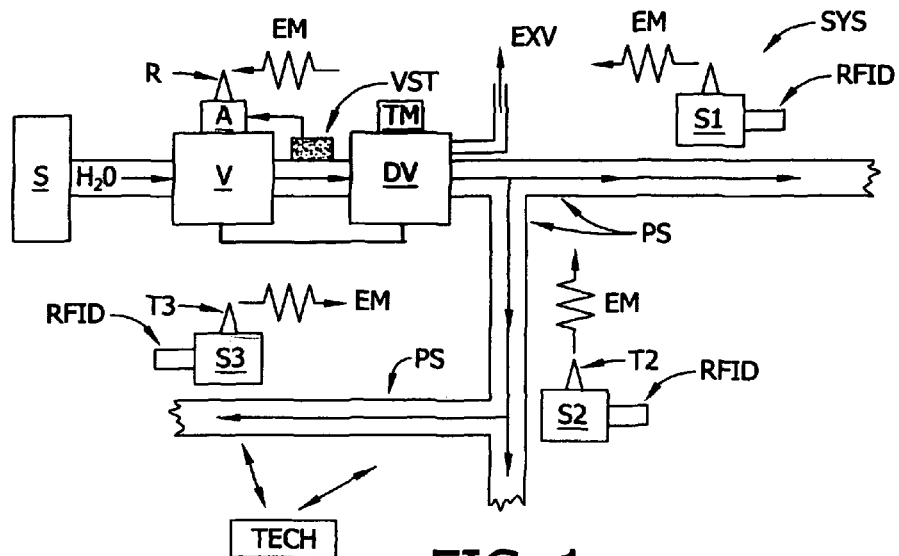
FIG. 1a shows a demonstrative present invention system (SYS).

Turning now to the Drawings, FIG. 1a there is shown a demonstrative system (SYS) for controlling access of water to a plumbing system (PS) in a house, building, boat or the like comprising:
  an actuator and valve (A) (V) combination characterized in that operation of the valve (V) controls water (H2O) flow therethrough from a source (S) of water into said plumbing system (PS), and the actuator controls operation of said valve (V), said actuator (A) having functionally associated therewith apparatus for receiving (R) electromagnetic signals (EM), (eg. RF, signal over power system etc.);
  a pressure dump valve (DV) and a vent (EXV) for use in externally discharging water outside a house, building, boat etc.;
  at least one water sensing means (S1) (S2) (S3) distally located from said actuator and valve (A) (V) combination, comprising a communication apparatus for transmitting (T1) (T2) (T3) an electromagnetic signal (EM) to the actuator (A) of the actuator and valve (A) (V) combination when said at least one distally located water sensing means (S1) (S2) S3) sense the presence of water at its location.
(Note: the sensors (S1) (S2) (S3) are shown located near plumbing system (PS) pipes, as they will normally be, but it is to be understood that sensors can be located anywhere in a house, building, boat or the like where the presence of unintended water would be undesirable. Also, it is to be considered that electrical power is provided to each sensor (S1) (S2) (S3) from the grid and/or from battery where desired).

As described above, upon the sensing of water by a sensor (S1) (S2) (S3) an electromagnetic signal (EM) is caused to be transmitted to the apparatus for receiving (R) electromagnetic signals (EM) functionally associated with said actuator (A) of the actuator and valve (A) (V) combination, to the end that operation of said valve (V) occurs to stop water (H2O) flow therethrough. And as also described above, said electromagnetic signal can be transmitted from said at least one distally located water sensing means through wiring in the house, building, boat or the like or over the air wirelessly. Further, while FIG. 1a directly shows the (EM) receiving apparatus is associated with the actuator and valve (A) (V) combination, with a signal path thereunder to the dump valve (DV), (EM) receiving apparatus can just as well be similarly directly associated with the dump valve (DV), or with both the actuator and valve (A) (V) combination and the dump valve (DV). However, operation of the dump valve (DV) before operation of the actuator and valve (A) (V) combination to shut water flow into the plumbing system (PS) is not generally advised, as that would cause pressurized release of water from the source (S) thereof, FIG. 1a directly shows a preferred embodiment of a present invention system. FIG. 1a is to be interpreted to indicate any workable approach.

It is also to be noted that a temperature sensor (TM) is shown associated with the dump valve (DV). That is, the dump valve (DV) can double in use as a freeze-dump valve, which, upon detecting a below freezing temperature, will send a signal to the pressure dump valve (DV), which in turn opens to release pressure in the plumbing system (PS), (eg. vented to outside (EXV), which can be a drain etc.). If this happens, it is combined with providing a signal to the actuator valve (A) (V) so that water flow from the source (S) of water into said plumbing system (PS) is stopped.

Note also the presence of apparatus for locating the sensors (S1) (S2) S3), labeled (RFID). In practice periodic testing of sensors is desirable to assure their operability. However, it can occur that a testing technician (TECH) might not be the same technician that installed the sensors, and therefore might not be aware of their locations in a house, building or boat or the like. Providing a location identifying means allows said testing technician to interrogate the system and in return receive signals transmitted from the (RFID) transmitters, thereby allowing him or her to seek out all sensors for testing.

FIG. 1a further shows a water flow sensor (VST) to sense water flow through said valve (V). This can be an ultrasonic flow rate sensor. Said water flow sensor (UST) provides a signal to said actuator and valve (A)(V) combination, and operation of the valve (V) is blocked when said flow rate is above a designated level, but operation of said valve (V) when said flow rate decreases below said designated rate is allowed. Of course, this is overridden if a water sensor (S1) (S2) (S3) indicates unintended water is present at a location in the house, building, boat or the like.

FIG. 1b shows an alternative present invention system (SYS). It is much the same that in as FIG. 1a, except, importantly, there is only one water control system (WCS) in place of the FIG. 1a actuator and valve (A) (V) combination. Said water control system (WCS) comprises an actuator (A), water flow valve (V) and pressure dump valve (PD) in functional combination. In that operation of the water flow valve (V) controls water flow therethrough from a source (S) of water into said plumbing system (PS), said pressure dump valve (PD) controls release of pressure in the plumbing system (PS). The actuator (A) controls operation of said water control system (WCS), said actuator (A) having functionally associated therewith apparatus for receiving electromagnetic signals (EM). Note that the temperature sensor can be located differently than shown in FIG. 1a, and in general can be anywhere in a protected house, building, boat or the like area.

Figure 3:
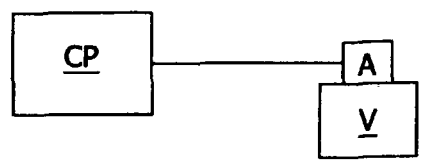
FIG. 3 shows a control panel (CP) which can be used to manually override the system (SYS) by directly causing actuator (A) operation.

FIGS. 1c1-1c3 show that a present invention water control system (WCS) can, functionally comprise three ports, said three ports being:
- an input port (IP) for receiving water from said source (S) thereof;
- an output port (OP) for entering water received by the input port to said plumbing system (PS); and
- a pressure dump port (PD).

Said water control system (WCS) can be operated to any of at least three positions, said three positions functionally providing that:
- FIG. 1c1 water flows from said input port (IP) to said output port (OP) and said pressure dump port is closed;
- FIG. 1c2 water does not flow from said input port (IP) to said output port (OP) and said pressure dump port (PD) is closed; and
- FIG. 1c3 water does not flow from said input port (IP) to said output port (OP) and said pressure dump port (PD) is open thereby releasing pressure in said plumbing system.

Figure 4:
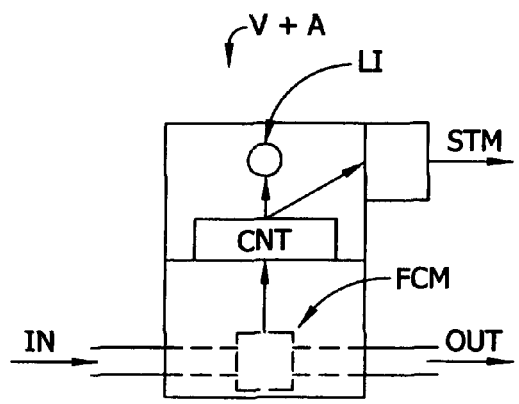
Figure 5:
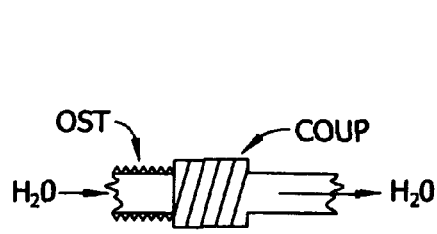
FIG. 5 is provided to demonstrate that apparatus for receiving water from an external source (S) can be a coupler (COUP) with, or without, optional screw threads (OST). A coupler (COUP) can comprise a soldered or welded system.

FIGS. 1c4 and 1c5 demonstrative a possible present invention water control system (WCS) practical embodiment. Note an inner element (INE) is present inside an outer element (OTE). The inner element (INE) has two machined pathways therethrough, a water flow (WF) pathway and a pressure dump (PD) pathway. In use the inner element (INE) can be rotated by actuator (A) action to position either the water flow (WF) pathway or a pressure dump (PD) pathway with the output port (OP). When one pathway, (WF) or (PD) is lined-up with the output port (OP), the other is not so lined-up. This allows rotating the inner element (INE) to allow water to flow from the source (S) into the input port (IP) and out of the output port (OP) into the plumbing system (PS), or rotating the inner element (INE) a shown 180, (could be 90 etc.), degrees, to allow pressure in the plumbing system to exhaust through the pressure dump port (PD) into the outside (EXV). It should be noted that both can not occur simultaneously, and when one pathway is operational the other is blocked.

Figure 6:
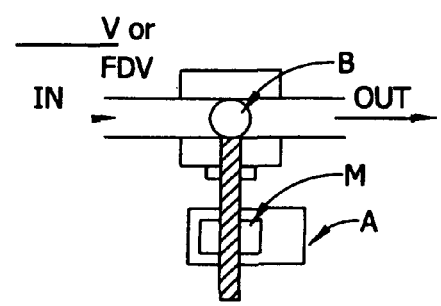
FIG. 6 is included to show that a water flow control valve (V) can comprise apparatus for automatically operating said water flow control valve, (eg. a motor (M)), and apparatus for receiving electromagnetic signals for actuating, (eg. an actuator (A)), said automatic operation.

FIGS. 1c6-1c8 demonstrate an alternative approach to a practical embodiment whit a different port configuration. FIG. 1c6 show a valve (V) which attaches a plumbing system (PS) to a water flow (WF) from the source (S) in an "on" position. FIG. 1c8 shows the valve (V) attaching the plumbing system (PS) to the exhaust vent (EXV) in a "pressure relief" position. FIG. 1c7 shows the valve in a fully off water flow (WF) blocking position.

Figure 2A:
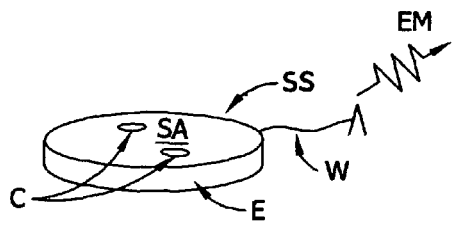
FIGS. 2a and 2b show a demonstrative sensor (SS) connected by a wire (W) to the apparatus for transmitting (T) electromagnetic signals (EM).
Figure 2B:
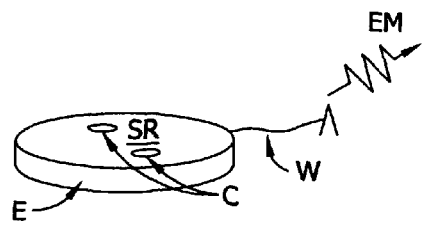

FIG. 2a shows a demonstrative sensor (SS) connected by a wire (W) to the apparatus for transmitting (T) electromagnetic signals (EM). Note that it has a side thereof, (eg. (SA)) facing up. FIG. 2b shows the same sensor (SS) with side (SR) facing up. This is to make clear that the contacts (C) can be present on both sides (SA) and (SR) so that no matter how the sensor (SS) is oriented it can reliably sense water. Further, the shape of the sensor (SS) is such that the likelihood of it being in a stable orientation while sitting on an edge (E) is essentially non-existent. Also, the sensors (SS) are somewhat heavy, (eg. 2 ounces), have a flexible electrical interconnect for accessing external wires, and as such are not prone to sitting on an outer edge thereof. An analogy is in order. While flipping a quarter and letting it land on the ground might result in it sitting on its edge, the likelihood of such is simple not great. Likewise, placing a present invention sensor (SS) on a surface might result in it sitting on its edge, the likelihood of that is small. And even if it does happen, the present invention sensors (SS) comprise an alarm mechanism for sensing such an orientation, and said alarm will then sound if a sensor does become improperly oriented, which will lead to corrective action being taken. FIGS. 2a and 2b demonstrate sensor means.

Figure 2C:
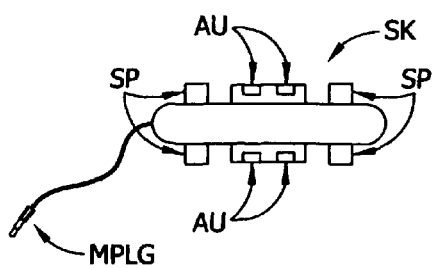
FIGS. 2c and 2d show an alternative sensor (SK) in combination with a base unit (BU) to which it is connected via a lay flat connector.
Figure 2D:
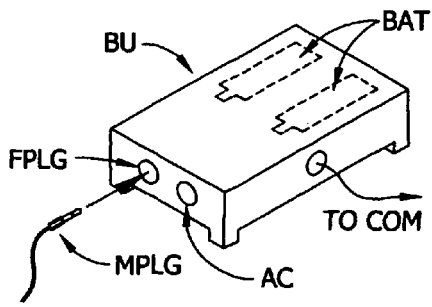

FIGS. 2c shows an alternative sensor (SK) which is used in combination with a FIG. 2d base unit (BU), to which it is connected via a lay flat connector (MPLG). Note the alternative sensor (SK) comprises gold plated contacts (AU) on both sides of a substantially flat system, which has spacers (SP) present for supporting the alternative sensor (SK) on a surface. Note FIG. 2d shows the base unit (BU) can be operated by batteries (BAT), or by AC via the shown adapter. Note also the base unit (BU) has a socket (FPLG) into which the lay flat connector (MPLG) plugs in use, and the curved sides, which prevent non-flat orientation.

FIG. 3 shows a control panel (CP) which can be used to manually override the system (SYS) by directly causing actuator (A) operation.

FIG. 4 generally shows a valve (V) comprising a fluid flow control means (FCM), said valve (V) also comprising a counter (CNT), a light indicator (LI), and a signal transmission means (STM). The counter (CNT) counts each time the flow control means (FCM) operates, and upon reaching a predetermined number sends at least one signal, for instance, via operation of the light indicator (LI) and/or signal transmission means (STM).

FIG. 5 is provided to demonstrate that apparatus for receiving water from an external source (S) can be a coupler (COUP) with, or without, optional screw threads (OST). A coupler (COUP) can comprise a soldered or welded system.

FIG. 6 is included to show that a water flow control valve (V) can comprise apparatus for automatically operating said water flow control valve, (eg. a motor (M)), and apparatus for receiving electromagnetic signals for actuating, (eg. an actuator (A)), said automatic operation.

FIGS. 7*a* and 7*b* demonstrate an orientation detection means in the form of a mercury (Hg) switch, which when in the FIG. 7*a* orientation does not conduct electricity between electrodes (EL1) and (EL2), but in FIG. 7*b* does conduct between said electrodes (EL1) and (EL2).

FIGS. 7*c* and 7*d* show an alternative orientation detection means in the form of a dual contact (C) system in functional combination with a ball (BA) in an enclosure. When oriented as in FIG. 7*c* the contacts (C) are not connected together, but when oriented as in FIG. 7*d*, the ball (BA) provides an electrical pathway therebetween.

FIG. 8 is included to show a source of electromagnetic radiation (EM) can be a circuit comprising a capacitor (CAP) and inductor (IND) supplied by a variable voltage (V).

For clarity, it is noted that the terminology "Valve" is to be interpreted broadly for the purposes of the present invention. In general, a "Valve" must include apparatus for controlling fluid flow therethrough or out thereof, but can comprise any number of additional means.

Finally, the present invention is premised on being used in an "enclosed space". However, it is within the scope of the present invention that it could be applied in an "open space". Therefore, while the preferred embodiment involves use in an enclosed space, the word "enclosed" is to be interpreted broadly to include a space "enclosed" by atmosphere. Further, while the sensor contacts were described as "gold plated", said language is to be interpreted to include solid gold contacts.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A system for controlling access of water to a plumbing system comprising:
   a water control system comprising, in a single integrated unit, an actuator, water flow valve and pressure dump valve in functional combination, such that operation of the water flow valve controls water flow therethrough from a source of water into said plumbing system, said pressure dump valve controls release of pressure in the plumbing system, and the actuator controls operation of said water control system via a rotational motion of an inner element, said actuator having functionally associated therewith apparatus for receiving electromagnetic signals; and
   at least one water sensing means locally or distally located from said water control system comprising a communication apparatus for transmitting an electromagnetic signal to the apparatus for receiving electromagnetic signals associated with the actuator when said at least one locally or distally located water sensing means senses the presence of water at its location;
   such that in use the water control system is located between the source of water and the plumbing system, and the at least one locally or distally located water sensing means is positioned at a location at which it is desired to prevent the presence of unintended and undesired water, such that if water is sensed by said at least one locally or distally located water sensing means, an electromagnetic signal is caused to be sent to the apparatus for receiving an electromagnetic signal functionally associated with said actuator, to the end that, via a rotational motion of said inner element, the water flow valve is caused to operate to prevent the flow of water therethrough, and thereafter, via a rotational motion of said inner element, said pressure dump valve is caused to open and release pressure in said plumbing system.

2. A system as in claim 1, wherein the water control system comprises three ports, said three ports being:
   an input port for receiving water from said source thereof;
   an output port for entering water received by the input port to said plumbing system; and
   a pressure dump port;
   and wherein said water control system is operated to any of at least three positions via actuator caused rotational motion of said inner element, said three positions functionally providing that:
   water flows from said input port to said output port and said pressure dump port is closed;
   water does not flow from said input port to said output port and said pressure dump port is closed; and
   water does not flow from said input port to said output port and said pressure dump port is open thereby releasing pressure in said plumbing system.

3. A system as in claim 1, which comprises a locally positioned water sensing means near or integrated into said water control system, such that the presence of water thereat causes a signal to be provided to said apparatus for receiving an electromagnetic signal functionally associated with said actuator, which in turn causes said water flow valve operation to stop water flow into said plumbing system and said pressure dump valve to release pressure in said plumbing system.

4. A system as in claim 1, in which a signal is provided to said apparatus for receiving an electromagnetic signal functionally associated with said actuator by said at least one distal or locally positioned water sensing means.

5. A system as in claim 1, which comprises a plurality of distally located water sensing means placed in a plurality of locations distal from said water control system, each of which comprises a communication apparatus for transmitting an electromagnetic signal to said actuator.

6. A system as in claim 1, which further comprises a temperature sensor and an associated communication apparatus for transmitting an electromagnetic signal to the apparatus for receiving an electromagnetic signal functionally associated with said actuator when temperature approaches or dips below freezing, such that the water flow valve is caused to stop water flow into said plumbing, and said pressure dump valve is caused to operate and release pressure in said plumbing system.

7. A system as in claim 1, wherein the electromagnetic signal is transmitted from said at least one locally or distally located water sensing means via a selection from the group consisting of:
   a) through wiring; and
   b) wirelessly.

8. A method of controlling access of water to a plumbing system, comprising:
   a) providing a system for controlling access of water to a plumbing system comprising:
      in a single integrated unit, a water control system comprising an actuator, water flow valve and pressure dump valve in functional combination, such that operation of the water flow valve controls water flow therethrough from a source of water into said plumbing system, said pressure dump valve controls release of pressure in the plumbing system, and the actuator controls operation of said water control system via a rotational motion of an inner element, said actuator having functionally associated therewith apparatus for receiving electromagnetic signals; and at least one water sensing means locally or distally located from said water control system comprising a communication apparatus for transmitting an electromagnetic signal to the apparatus for receiving electromagnetic signals associated with the actuator when said at least one locally or distally located water sensing means senses the presence of water at its location;

such that in use the water control system is located between the source of water and the plumbing system, and the at least one locally or distally located water sensing means is positioned at a location at which it is desired to prevent the presence of unintended and undesired water, such that if water is sensed by said at least one locally or distally located water sensing means, an electromagnetic signal is caused to be sent to the apparatus for receiving an electromagnetic signal functionally associated with said actuator, to the end that the water flow valve is caused to operate to prevent the flow of water therethrough, and thereafter said pressure dump valve is caused to open and release pressure in said plumbing system; and b) upon the sensing of water by said at least one locally or distally located water sensing means, causing an electromagnetic signal to be transmitted to the apparatus for receiving electromagnetic signals functionally associated with said actuator, to the end that actuator caused rotational motion of said inner element operation of said water flow valve occurs to stop water flow therethrough and said pressure dump valve is then, by actuator caused rotational motion of said inner element caused to release pressure in said plumbing system.

9. A method as in claim 8, wherein the electromagnetic signal is transmitted from said at least one locally or distally located water sensing means via a selection from the group consisting of:
   a) through wiring; and
   b) wirelessly.

10. A method as in claim 8, which further comprises providing temperature sensor and an associated communication apparatus for transmitting an electromagnetic signal to the apparatus for receiving electromagnetic signals associated with said actuator when temperature approaches or dips below freezing, such that the water control system is caused to stop water flow into said plumbing system and said pressure dump valve is thereafter caused to operate and release pressure in said plumbing system.

11. A system for controlling access of water to a plumbing system comprising:
   an integrated actuator and valve combination such that operation of the valve controls water flow therethrough from a source of water into said plumbing system, and the actuator controls operation of said valve via rotation of an inner element, said actuator having functionally associated therewith apparatus for receiving electromagnetic signals;
   at least one water sensing means locally or distally located from said actuator and valve combination comprising a communication apparatus for transmitting an electromagnetic signal to the actuator of the actuator and valve combination when said at least one locally or distally located water sensing means senses the presence of water at its location; and
   a pressure dump valve for releasing pressure in the plumbing system which is also integrated into the actuator and valve combination, and which actuator also causes said pressure dump valve operation via rotation of said inner element;

such that in use the actuator and valve combination is located between the source of water and the plumbing system, and the at least one locally or distally located water sensing means is positioned at a location at which it is desired to prevent the presence of unintended and undesired water, such that if water is sensed by said at least one locally or distally located water sensing means, an electromagnetic signal is caused to be sent by the at least one water sensing means and is received by the apparatus for receiving an electromagnetic signal functionally associated with said actuator, to the end that the valve operates and prevents the flow of water therethrough, and such that said pressure dump valve is caused to open and release pressure therein, after the actuator and valve combination is caused to stop water flow into said plumbing;

said system being distinguished in that said actuator and valve combination and pressure dump valve are in a single integrated unit, and in which said actuator causes rotation of said inner element to control water flow from said water source to said plumbing system, and to effect pressure dump.

12. A system as in claim 11, which comprises a locally positioned water sensing means near or integrated into said actuator and valve combination, such that the presence of water thereat causes a signal to be provided to said actuator which causes valve operation to stop water flow into said plumbing system.

13. A system as in claim 11, in which a signal is provided to said pressure dump valve by said actuator and valve combination when it has operated to stop water flow into said plumbing system.

14. A system as in claim 11, in which a signal is provided to said pressure dump valve by said at least one distal or locally positioned water sensing means.

15. A system as in claim 11, which comprises a plurality of distally located water sensing means placed in a plurality of locations distal from said actuator and valve combination, each of which comprises a communication apparatus for transmitting an electromagnetic signal to the actuator of the actuator and valve combination.

16. A system as in claim 11, which further comprises a temperature sensor and an associated communication apparatus for transmitting an electromagnetic signal to the actuator of the actuator and valve combination when temperature approaches or dips below freezing, such that the actuator and valve combination is caused to stop water flow into said plumbing, and said pressure dump valve is also caused to operate and release pressure in said plumbing system.

17. A system as in claim 11, wherein the electromagnetic signal is transmitted from said at least one locally or distally located water sensing means via a selection from the group consisting of:
   a) through wiring; and
   b) wirelessly.

18. A method of controlling access of water to a plumbing system, comprising:
   an integrated actuator and valve combination such that operation of the valve controls water flow therethrough from a source of water into said plumbing system, and the actuator controls operation of said valve via rotation of an inner element, said actuator having functionally associated therewith apparatus for receiving electromagnetic signals;

at least one water sensing means locally or distally located from said actuator and valve combination comprising a communication apparatus for transmitting an electromagnetic signal to the actuator of the actuator and valve combination when said at least one locally or distally located water sensing means senses the presence of water at its location; and a pressure dump valve for releasing pressure in the plumbing system which is also integrated into the actuator and valve combination, and which actuator also causes said pressure dump valve operation via rotation of said inner element;

such that in use the actuator and valve combination is located between the source of water and the plumbing system, and the at least one locally or distally located water sensing means is positioned at a location at which it is desired to prevent the presence of unintended and undesired water, such that if water is sensed by said at least one locally or distally located water sensing means, an electromagnetic signal is caused to be sent by the at least one water sensing means and is received by the apparatus for receiving an electromagnetic signal functionally associated with said actuator, to the end that the valve operates and prevents the flow of water therethrough, and such that said pressure dump valve is caused to open and release pressure therein, after the actuator and valve combination is caused to stop water flow into said plumbing;

said system being distinguished in that said actuator and valve combination and pressure dump valve are in a single integrated unit, and in which said actuator causes rotation of said inner element to control water flow from said source to said plumbing system, and to effect pressure dump; and b) upon the sensing of water by said at least one locally or distally located water sensing means, causing an electromagnetic signal to be transmitted to the apparatus for receiving electromagnetic signals functionally associated with said actuator of the actuator and valve combination, to the end that operation of said valve occurs to stop water flow therethrough and said pressure dump valve is caused to operate and release pressure in said plumbing system, all said operation being via actuator caused rotation of said inner element.

19. A method as in claim 18, wherein the electromagnetic signal is transmitted from said at least one locally or distally located water sensing means via a selection from the group consisting of:

a) through wiring; and b) wirelessly.

20. A method as in claim 18, which further comprises providing temperature sensor and an associated communication apparatus for transmitting an electromagnetic signal to the actuator of the actuator and valve combination when temperature approaches or dips below freezing, such that the actuator and valve combination is caused to stop water flow into said plumbing and said pressure dump valve is also caused to operate and release pressure in said plumbing system.

* * * * *